US008253278B2

(12) United States Patent
Cook et al.

(10) Patent No.: US 8,253,278 B2

(45) Date of Patent: Aug. 28, 2012

(54) FERRITE ANTENNAS FOR WIRELESS POWER TRANSFER

(75) Inventors: Nigel P Cook, El Cajon, CA (US); Lukas Sieber, Olten (CH); Hanspeter Widmer, Wohlenschwil (CH); Peter Schwaninger, Hombrechtikon (CH)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 12/479,581

(22) Filed: Jun. 5, 2009

(65) Prior Publication Data

US 2011/0095617 A1 Apr. 28, 2011

Related U.S. Application Data

(60) Provisional application No. 61/059,241, filed on Jun. 5, 2008.

(51) Int. Cl.
*H01F 27/00* (2006.01)
*H01F 27/42* (2006.01)

(52) U.S. Cl. ........................................................ 307/104

(58) Field of Classification Search ................... 307/104
See application file for complete search history.

(56) References Cited

U.S. PATENT DOCUMENTS 3,226,725 A * 12/1965 Ritchie et al. ................. 343/745
4,484,056 A * 11/1984 Rossell ...................... 219/86.51
4,667,158 A * 5/1987 Redlich .................... 324/207.19
4,841,767 A * 6/1989 Morel ............................. 73/159
4,904,921 A * 2/1990 DeVito et al. ................. 323/264
4,954,776 A * 9/1990 Husher .................... 324/207.16
5,040,239 A * 8/1991 Kondo et al. .............. 455/193.1
5,109,675 A * 5/1992 Hwang ........................... 60/660
5,771,165 A 6/1998 Couture et al.
5,777,468 A * 7/1998 Maher ...................... 324/207.18
5,991,665 A 11/1999 Wang et al.
6,020,569 A * 2/2000 Cecil et al. .................... 219/109
6,191,575 B1 * 2/2001 Mednikov et al. ....... 324/207.16
6,320,360 B1 * 11/2001 Zannini ......................... 323/249
6,427,949 B1 * 8/2002 Hager et al. .................. 246/220
6,828,779 B2 * 12/2004 Townsend et al. ....... 324/207.12
6,889,563 B2 * 5/2005 Tomita et al. .............. 73/861.57
7,057,486 B2 * 6/2006 Kiko ............................ 336/178
7,106,266 B1 * 9/2006 Pauley .......................... 343/788
7,239,144 B2 * 7/2007 Oppelt et al. ................. 324/322
7,518,267 B2 4/2009 Baarman
7,587,930 B2 * 9/2009 Leclerc et al. ............. 73/114.28
7,671,736 B2 * 3/2010 Iverson et al. ........... 340/539.22
7,728,692 B2 * 6/2010 Fortier ............................ 333/12

(Continued)

FOREIGN PATENT DOCUMENTS

EP 1211776 6/2002

(Continued)

OTHER PUBLICATIONS

International Search Report and Written Opinion—PCT/US2009/046513, International Search Authority—European Patent Office—Jul. 12, 2009.

*Primary Examiner* — Adi Amrany

(74) *Attorney, Agent, or Firm* — Knobbe Martens Olson & Bear LLC

(57) ABSTRACT

Ferrite core antenna used for transmitting or receiving wireless power. The antenna can move relative to the core.

28 Claims, 5 Drawing Sheets

U.S. PATENT DOCUMENTS

| | | | | |
|---|---|---|---|---|
| 7,913,566 | B2 * | 3/2011 | Hedtke | 73/649 |
| 2005/0062573 | A1 * | 3/2005 | Nicholson | 336/126 |
| 2005/0163063 | A1 * | 7/2005 | Kuchler et al. | 370/278 |
| 2006/0266435 | A1 * | 11/2006 | Yang et al. | 148/105 |
| 2008/0191693 | A1 * | 8/2008 | Jones et al. | 324/238 |
| 2009/0096413 | A1 * | 4/2009 | Partovi et al. | 320/108 |
| 2011/0133488 | A1 * | 6/2011 | Roberts et al. | 290/1 R |

FOREIGN PATENT DOCUMENTS

| | | |
|---|---|---|
| WO | WO0054387 | 9/2000 |
| WO | WO03105308 | 12/2003 |
| WO | WO2004073166 | 8/2004 |
| WO | WO2008012702 | 1/2008 |
| WO | WO2009149426 | 12/2009 |
| WO | WO 2009149426 A2 * | 12/2009 |

* cited by examiner

Size ‘L’ (40 mm x 10 mm Ø)
Pr < 1 W
FIG. 7A
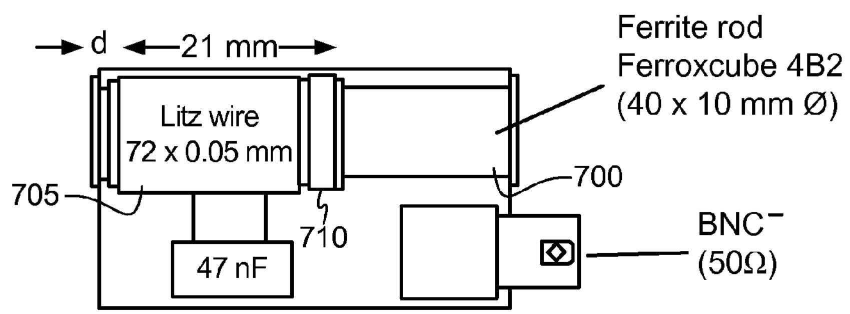
FIG. 7B
Size ‘S’ (22 mm x 8 mm Ø)
Pr < 0.5 W
FIG. 8A
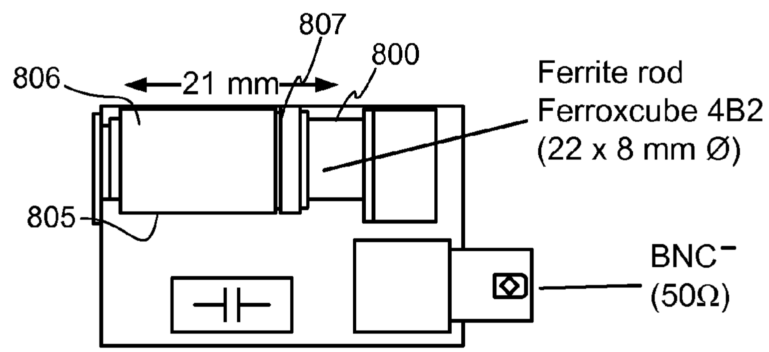
FIG. 8B

FERRITE ANTENNAS FOR WIRELESS POWER TRANSFER

This application claims priority from provisional application No. 61/059,241, filed Jun. 5, 2008, the entire contents of which disclosure is herewith incorporated by reference.

BACKGROUND

The applicant's previous applications and provisional applications, including, but not limited to, U.S. patent application Ser. No. 12/018,069, filed. Jan. 22, 2008, entitled "Wireless Apparatus and Methods", the disclosure of which is herewith incorporated by reference, describe wireless transfer of power. The transmit and receiving antennas of one exemplary embodiment are resonant antennas, which are substantially resonant; e.g., within 10% of resonance, 15% of resonance, or 20% of resonance. The antenna of an exemplary embodiment is of a small size to allow it to fit into a mobile, handheld device where the available space for the antenna may be limited. An exemplary embodiment describes a high efficiency antenna for the specific characteristics and environment for the power being transmitted and received. Antenna theory suggests that a highly efficient but small antenna will typically have a narrow band of frequencies over which it will be efficient.

SUMMARY

The special antenna described herein may be particularly useful for this kind of power transfer.

One exemplary embodiment uses an efficient power transfer between two antennas by storing energy in the near field of the transmitting antenna, rather than sending the energy into free space in the form of a travelling electromagnetic wave. This exemplary embodiment increases the quality factor (Q) of the antennas. This can reduce radiation resistance ($R_r$) and loss resistance In one exemplary embodiment, two high-Q antennas are placed such that they react similarly to a loosely coupled transformer, with one antenna inducing power into the other.

The antennas may have Qs that are greater than 200, although the receive antenna may have a lower Q caused by integration and damping.

The transmit and receiving antennas may be resonant antennas, which are substantially resonant, e.g., within 10% of resonance, 15% of resonance, or 20% of resonance. The antenna may be of a small size to allow it to fit into a mobile, handheld device where the available space for the antenna may be limited. An exemplary embodiment describes a high efficiency antenna for the specific characteristics and environment for the power being transmitted and received.

One exemplary embodiment uses an efficient power transfer between two antennas by storing energy in the near field of the transmitting antenna, rather than sending the energy into free space in the form of a travelling electromagnetic wave. This exemplary embodiment increases the quality factor (Q) of the antennas. This can reduce radiation resistance ($R_r$) and loss resistance ($R_l$).

BRIEF DESCRIPTION OF THE DRAWINGS

In the Drawings:

FIGS. 5-8B show shows a measurement set up; and

DETAILED DESCRIPTION

Figure 1:
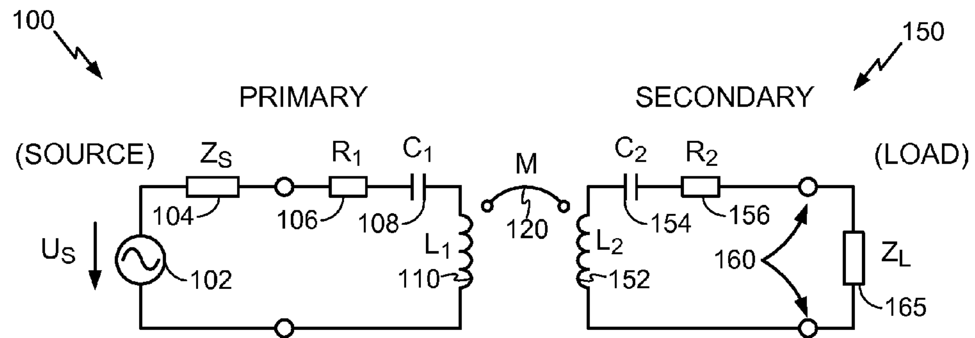
FIGS. 1 and 2 show equivalent circuits.

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form, of energy associated with electric fields, magnetic fields, electromagnetic fields, or otherwise that is transmitted between from a transmitter to a receiver without the use of physical electromagnetic conductors.

An exemplary embodiment uses ferrites in antennas for transmission and reception of magnetic flux used as wireless power. For example, ferrite materials usually include ceramics formed of MO—$Fe_2O_3$, where MO is a combination of divalent metals such as zinc, nickel, manganese and copper oxides. Common ferrites may include MnZn, NiZn and other Ni based ferrites.

Ferrite structures concentrate magnetic flux lines into the structure, thereby creating a magnetic path/field with less interference and eddy current losses in device electronics. This in essence sucks in the magnetic flux lines, thereby improving the efficiency of the magnetic power distribution. An embodiment describes a ferrite rod-shaped antennas. These may provide compact solutions that are easy to integrate into certain kinds of packaging. Also, the properties of ferrites may improve wireless power transmission.

The resonance frequency of Ferrite rod antennas may be easier to tune. In one exemplary embodiment, the tuning may be carried out by mechanically adjusting the position of the coil on the rod.

However, Ferrite rod antennas may suffer from Q degradation at higher magnetic field strengths (higher receive power levels) due to increasing hysteresis losses in Ferrite material. Also, Ferrites may only be practical at relatively low frequencies. At these low frequencies, however, ferrites have the advantage of channelling the magnetic field through the core, rather than through the electronics on the board near the core. This can help to increase the resulting Q of the circuit.

The present application describes use of special ferrite antennas to carry out wireless transfer of power. One exemplary embodiment describes ferrite antennas for low frequency, e.g., 135 Khz.

Exemplary embodiments describe that the hysteresis losses in ferrite material may occur at higher power receive levels and higher magnetic field strengths. In addition, increasing the magnetic field strength may actually shift the resonance frequency, especially in certain materials where there are nonlinear B-H characteristics in the ferrites. In addition, harmonics emissions can be generated to in due to inherent nonlinearity. This nonlinearity becomes more important at lower Q factors.

FIG. 1 is a block diagram of an inductively coupled energy transmission system between a source 100, and a load 150. The source includes a power supply 102 with internal impedance $Z_s$ 104, a series resistance $R_4$ 106, a capacitance C1 108 and inductance L1 110. The LC constant of capacitor 108 and inductor 110 causes oscillation at a specified frequency.

The secondary 150 also includes an inductance L2 152 and capacitance C2 154, which may be matched to the capacitance and inductance of the primary. A series resistance R2 156. Output power is produced across terminals 160 and applied to a load ZL 165 to power that load. In this way, the power from the source 102 is coupled to the load 165 through a wireless connection shown as 120. The wireless communication is set by the mutual inductance M.

Figure 2:
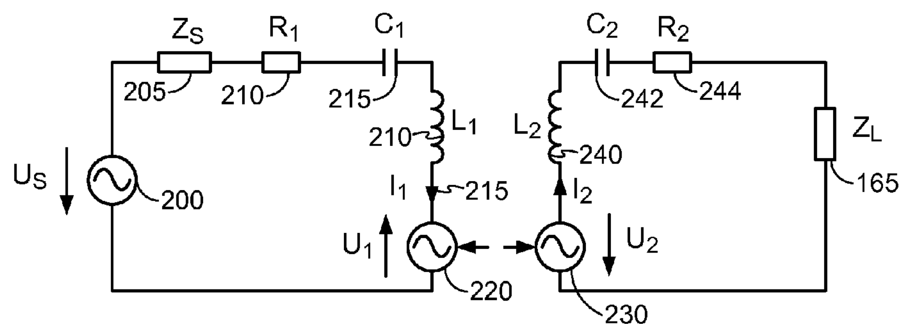

FIG. 2 shows an equivalent circuit to the transmission system of FIG. 1. The power generator 200 has internal impedance Zs 205, and a series resistance R1 210. Capacitor C1 215 and inductor L1 210 form the LC constant. A current I1 215 flows through the LC combination, which can be visualized as an equivalent source shown as 220, with a value U1.

This source induces into a corresponding equivalent power source 230 in the receiver, to create an induced power U2. The source 230 is in series with inductance L2 240, capacitance C2 242, resistance R2 244, and eventually to the load 165.

The electronic circuits may be connected to a coupling loop that couples the power electronically to a main inductive loop. The equivalent circuits noted above may refer to the main inductive loop, which is electrically disconnected from any circuit parts.

One exemplary embodiment is to compare the performance of these antennas, at different power levels and other different characteristics. By doing this, information about the way these materials operate in different characteristics is analyzed. Exemplary embodiments describe large (L), medium (M), and small (S) ferrite antennas, and their performances.

Ferrite Rod materials are normally used in communication receiver applications at small signal levels such as at or below 1 mW. No one has suggested using these materials at large power levels, e.g. up to 2 W or for power transfer.

Our applications have shown that antennas that are based on ferrites, or very magnetic materials may have certain advantages when used in transmitting and/or receiving wireless power. However, these antennas may be extremely application-specific: for example, while the ferrite can be used in many different applications and produce significant advantages in the wireless transmission of power, there uses are really limited to very constrained situations where the ferrites produce advantages. The present application also describes, however, that elongated shape of the ferrite Rod may in fact be advantageous at for some applications. Proper shaping of this elongated shape may actually improve the operation of the ferrite Rod, and as such may be important. Therefore, the exemplary embodiments define that this shape and location of a ferrite Rod used for and an antenna in a wireless power system as well is the materials used for that ferrite Rod, maybe crucially important.

Coils L1 and L2 in FIG. 1 and FIG. 2 may be tubular ferrite elements, with a coil wrapped there around. The tubular ferrite element has an elongated shape, meaning that the length of the element is larger wider than the width of the element as shown in FIG. 3.

Figure 3:
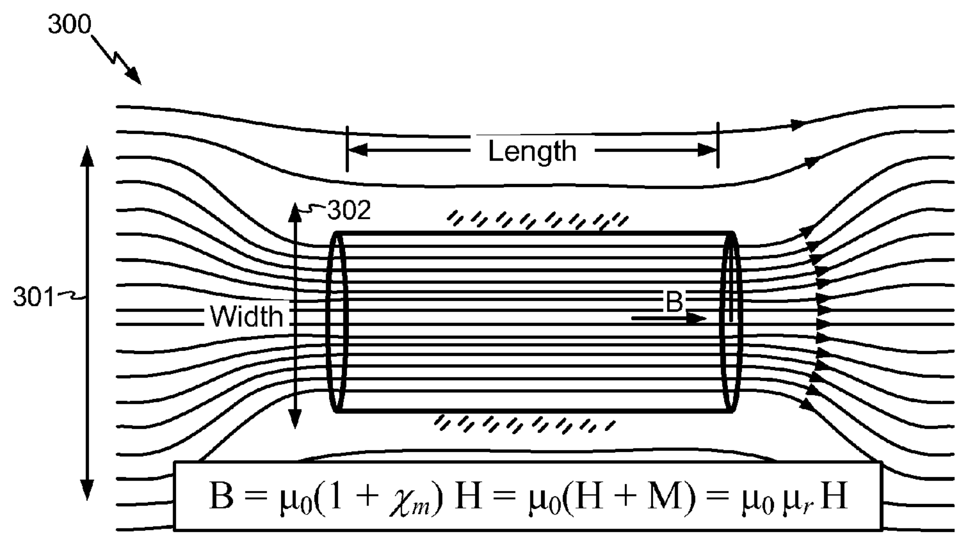
FIGS. 3 and 4 illustrate the uses of Ferrites.

FIG. 3 also illustrates how the ferrite in essence concentrates the magnetic field lines such as 300, where the field lines over an area 301 prior to the ferrite device are concentrated into an area 302, corresponding to the diameter of the ferrite device.

This magnification may improve the operation.

Through experimentation, the magnetic field was found to be equal $$B=\mu_0(1+\chi_m)H=\mu_0(H+M)=\mu_0\mu_r H$$

where u is the magnetic permeability of the material, and H is the magnetic field in amps per meter.

Figure 4:
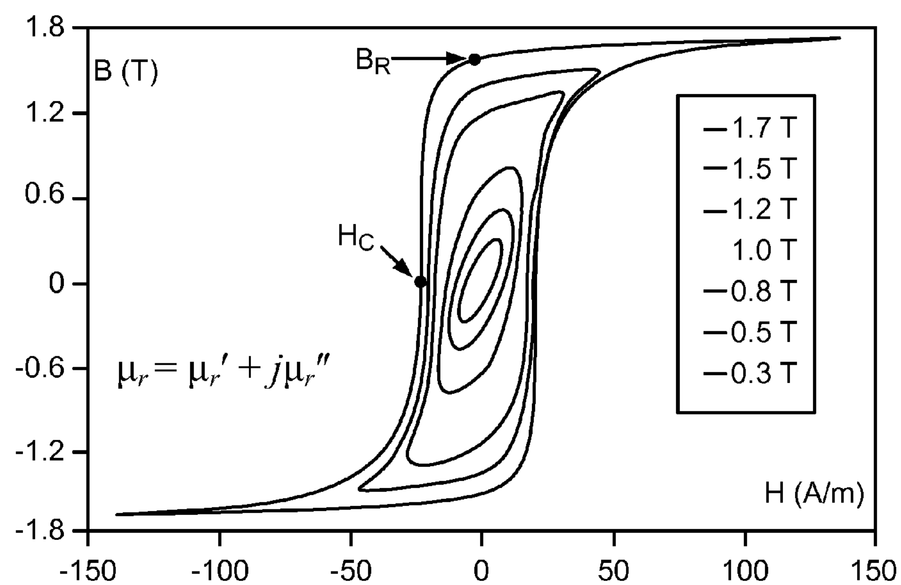

FIG. 4 illustrates a plot between the magnetic field H in amps per meter and the resultant magnetic fields B. This shows a hysteresis effect, and one exemplary embodiment defines maintaining the desired B and H fields at specified levels where the hysteresis losses are minimized.

Moreover, since the magnetic fields are concentrated in the ferrite, this provides less degradation due to neighborhood effects.

An exemplary embodiment describes different prototype exemplary embodiments and describes testing of different ferrite sizes and materials.

Figure 5:
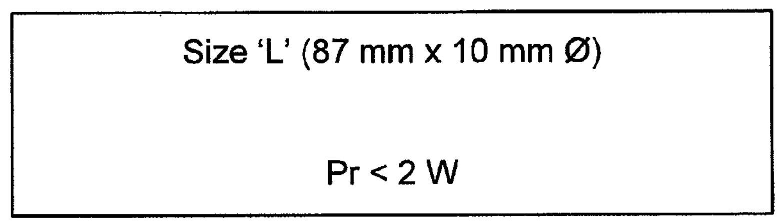
Figure 6:
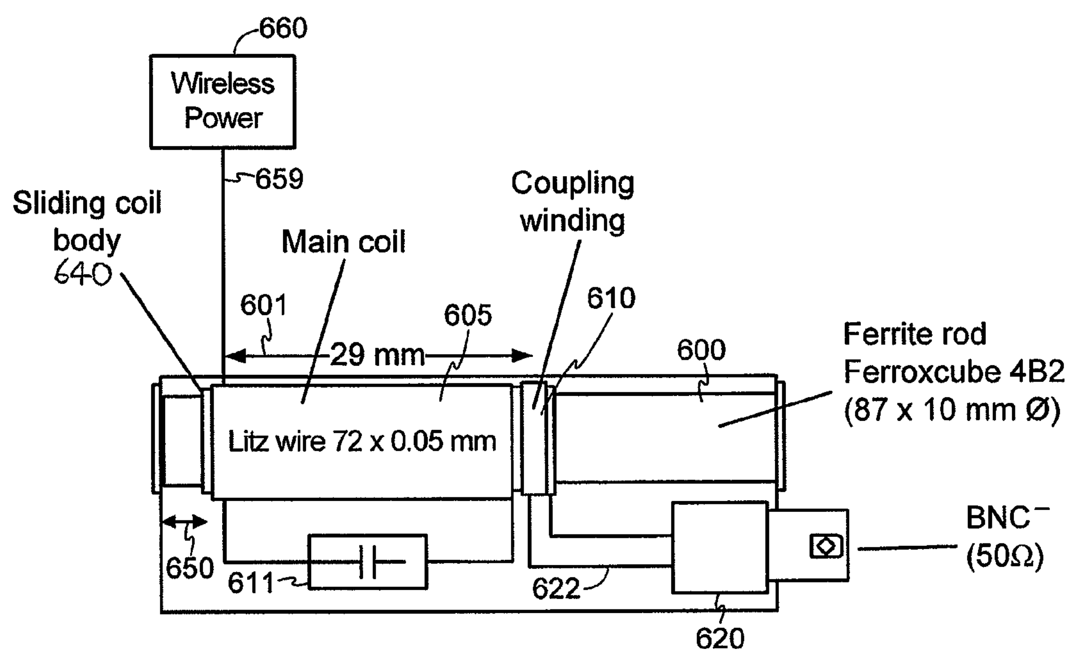

FIGS. 5 and 6 represents a first ferrite Rod which was tested as a prototype, called size L. Size L has a size of 87 mm×10 mm diameter. The ferrite Rod itself is shown in FIG. 6. The Rod 600 can be made of any ferrite material, but in an exemplary embodiment is made of the ferroxcube 4B2.

The ferrite Rod also has a main coil part 605 which slides relative to the ferrite Rod 600. The main coil is formed of litz wire, or more generally stranded contact wire, of a size 72×0.5 mm. A coupling winding is also mechanically coupled to the sliding main coil 605. The coupling winding 610 is electrically unconnected to the main coil 605, and may be formed of 1 to 10 coils of wire.

In operation, coupling winding receives power from the source, and couples that power to the main coil. The overall length of the sliding winding, litz wire plus coupling wire, is 29 mm, which slides along on the 87 mm ferrite Rod.

Exemplary embodiments described herein show different numbers of windings of main coil inductance, coupling coil inductance, and also show the effect of the value "d" which is shown as 650.

The connection to the assembly is shown via a BNC connector 620 that connects only to the coupling winding 610 via flexible connection cables 622. The cables are long enough such that the sliding coil 601 can slide anywhere on the sliding coil body 640.

The main coil 605 is also in parallel with a capacitor 611, forming the LC constant. In one exemplary embodiment, the connection between a capacitor and the coil may be made of flexible wires, or alternatively the capacitor can be mounted such that it moves whenever the coil is moved.

The coil/capacitor connection is connected to an output line 659, which itself is connected to a wireless power circuit 660. This circuit, for example, may be a wireless power transmitter that produces a modulated power signal at a frequency (e.g., 135 Khz), or a receiver that receives the wireless power and rectifies it.

The size L. may provide a transmit or receive power up to 2 W for example.

FIGS. 7A and 7B shows another exemplary embodiment of size M where the medium size ferrite Rod is used 40 mm×10 mm diameter. This may provide for receive power of 1 W or less, for example.

FIGS. 8A and 8B show the size small Rod, of 22 mm×8 mm in diameter. The rod itself, shown in FIG. 8B at 800, also has a sliding coil assembly 805 formed of a main coil and a coupling coil main coil 806 and a coupling coil 807. The device is formed in parallel with a capacitor. The size small device may have lost some of the size medium device may be usable for a power level of less than ½ W in an exemplary embodiment.

A number of tests were made for the different antennas, and different information can be found from these tests. For the ferrite antenna of size L, a number of different size devices could be used.

A first antenna tested had a main coil of approximately 24 mm in length, formed of 72 by 0.5 mm lits (stranded) wire. This forms an inductance of about 88.1 uH with a Q of 273 as 100 mV. In this exemplary embodiment, the capacitance used was 15.77 uF for a frequency of 135 kHz.

Figure 9:
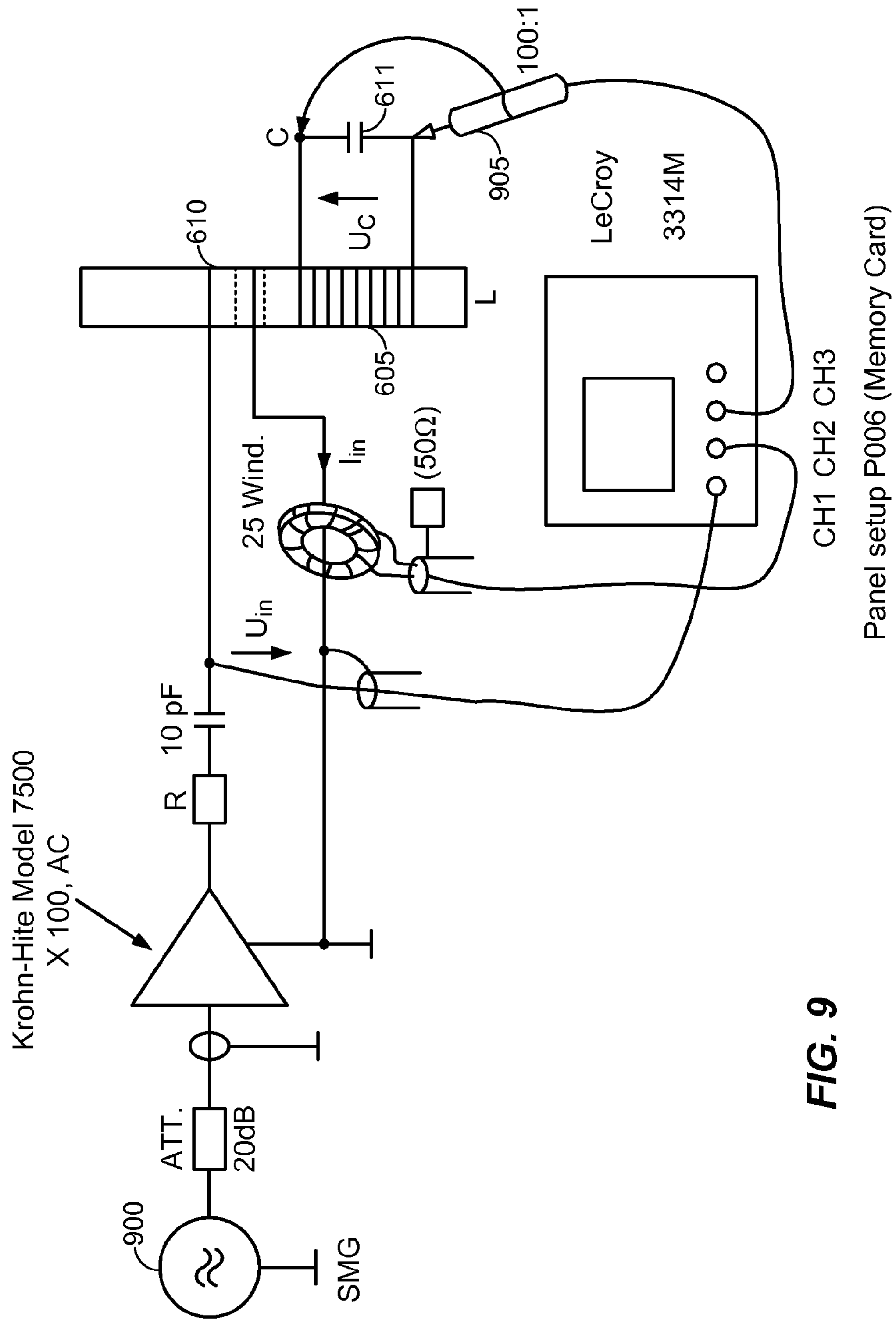
FIG. 9 shows a shows a measurement set up.

The test values described herein may use the test setup shown in FIG. 9 by using different capacitance and voltage values. According to one exemplary embodiment, the measurement may be carried out at by using transmit antennas, and assuming reciprocity as a receiving antenna. According to one exemplary embodiment, the Q value is used to determine a limit for the amount of power applied.

According to one exemplary embodiment, the characteristics of a ferrite Rod antenna are evaluated based on the following parameters →Coillength≈24 mm Coilmaterial–Litze72×0.05 mm →Induc tan ceL=88.1 μHbisd=8.5 mm/Q=273

→C=15.77 uF resonantfrequency $f_0$=135 kHz (100 mV)

Test results:

| | material | | cap | | Q 135 kHz | Q 1 MHz |
|---|---|---|---|---|---|---|
| 1 | MKC 61 | 400 V | 15u | J | 174 | 48.6 |
| 2 | ? | 400 V | 15u | M | 32.4 | 5.03 |
| 3 | ? | 400 V | 15u | K | 230 | 81 |
| 4 | MKS4 | 630 V | 33u | ? | 59 | 35 |
| 5 | ? | 630 V | 15u | 10% | 231 | 93 |
| 6 | ? | 400 V | 15u | 10% | 239 | 86 |
| 7 | MMK | 400 V | 15u | K | 239 | 86 |
| 8 | ERD 310 LCC | 63 V | 16u9 | | >4000 | 800 |
| 9 | WMA FKP −1 | 1000 V | 3u3 | | ca,2000 | ca,2000 |
| 10 | WMA FKP (OPTO 3000) | 63 V | 5u6 | 2.5% | ca,2000 | 337 |

| | | | | | | | |
|---|---|---|---|---|---|---|---|
| MKP4 | (WMA) | 15uf | 400 V~ | 5 × 11 × 13 | 823631 | a' | —$_6$97 |
| FKP1 | u | 15uf | 600 V~ | 6 × 15 × 26.5 | 823464 | a' | 1$_6$29 |

Agilent 4294A tested:
$L_{min}$ = 69 μH (Q = 245) (d = 0)
$L_{max}$ = 103.9 μH (Q = 311) (d = 30 mm)
$L_{Luft}$ = 6.31 μH Q = 28.4 (135 kHz)

With a capacitor of C=15 uF

These results are summarized in Table 1, which shows those results for the L antenna, 87 mm length, 10 mm diameter. The main coil is 24 mm long formed of 37 turns of wire. A 15.77 nf capacitor is used, and the measured inducatance (without the ferrite) is 6.31 uH:

TABLE 1

| Input (measured) | | | | Calculation | | | | |
|---|---|---|---|---|---|---|---|---|
| f res kHz | U in V rms | I in mA rms | Uc V rms | P in mW | Z in Ohm | L μH | X Ohm | Q UL U |
| 135 | 0.013 | 0.08 | 0.15 | 0.0010 | 162.500 | 88.134 | 74.757 | 289.397 |
| 134.97 | 0.04 | 0.27 | 0.46 | 0.0108 | 148.148 | 88.173 | 74.774 | 262.024 |
| 134.9 | 0.11 | 0.85 | 1.300 | 0.094 | 129.412 | 88.264 | 74.813 | 241.601 |
| 134.920 | 0.330 | 3.000 | 3.900 | 0.990 | 110.000 | 88.238 | 74.802 | 205.391 |
| 134.752 | 1.000 | 11.000 | 11.500 | 11.000 | 90.909 | 88.458 | 74.895 | 160.528 |
| 134.294 | 1.700 | 25.000 | 20.000 | 42.500 | 68.000 | 89.063 | 75.150 | 125.239 |
| 133.113 | 4.500 | 90.000 | 60.000 | 405.000 | 50.000 | 90.650 | 75.817 | 117.241 |
| 131.011 | 7.000 | 230.000 | 85.000 | 1610.000 | 30.435 | 93.582 | 77.034 | 58.255 |

The measurements used the test setup shown in FIG. 9, where a waveform generator 900 applied to the coupling loop 610, and the main loop is tested via a high impedance probe 905.

Additional Test results were as follows:

TABLE 2

| PSMG dBm | AH dB | Gain | Fo kHz | Vin Vrms | I in mA rms | Uc Vrms | R Ω | |
|---|---|---|---|---|---|---|---|---|
| +4 | 20 | ×10 | 134.625 | 0.403 | 5.46 | 5.03 | 50 | |
| −9 | 20 | ×10 | 134.797 | 0.0949 | 1.125 | 1.163 | 50 | |
| −19 | 20 | ×10 | 134.809 | 0.0302 | 0.4* | 0.362 | 50 | |
| −6 | 0 | ×10 | 133.956 | 1.1058 | 19.20 | 15.77 | 50 | |
| +2 | 0 | ×10 | 132.856 | 2.31 | 56.79 | 33.98 | 50 | |
| +10 | 0 | ×10 | 130.758 | 5.152 | 207.9 | 74.61 | 50* | |
| +6 | 0 | ×10 | 131.731 | 3.000 | 101.0 | 43.16 | 50* | " |
| +7.5 | 0 | ×10 | 131.478 | 3.445 | 121.9 | 49.6 | 50* | " |
| +13 | 0 | ×10 | 130.032 | 6.27 | 298.0 | 87.1 | 50* | " |
| −30 | 0 | ×10 | *135.000 | 0.0614 | 0.44 | 0.66 | 50 | |
| −20 | 0 | ×10 | 134.860 | 0.188 | 1.42 | 2.04 | 50 | |
| −10 | 0 | ×10 | 134.498 | 0.546 | 5.13 | 5.864 | 50 | |

TABLE 2-continued

| PSMG dBm | AH dB | Gain | Fo kHz | Vin Vrms | I in mA rms | Uc Vrms | R Ω |
|---|---|---|---|---|---|---|---|
| 0 | 0 | ×10 | 133.337 | 2.10 | 32.5 | 22.7 | 50 |
| +4 | 0 | ×10 | 132.700 | 3.43 | 61.7 | 37.0 | 50 |
| +7 | 0 | ×10 | 132.200 | 4.59 | 92.64 | 49.4 | 50 |
| +10 | 20 | ×100 | 131.657 | 6.37 | 141 | 67.57 | 50 |
| +13 | 20 | ×100 | 131.037 | 8.227 | 208.3 | 87.58 | 50 |

Another exemplary embodiment tested the "L" antenna prototype with the same characteristics as above, with a 3 turn coupling coil. The results were:

TABLE 3

| PSMG dBm | AH dB | Gain | Fo kHz | Vin Vrms | I in mA rms | Uc Vrms | R Ω | Note/ Remark |
|---|---|---|---|---|---|---|---|---|
| +4 | 20 | ×10 | 134.625 | 0.403 | 5.46 | 5.03 | 50 | |
| −9 | 20 | ×10 | 134.797 | 0.0949 | 1.125 | 1.163 | 50 | |
| −19 | 20 | ×10 | 134.809 | 0.0302 | 0.4* | 0.362 | 50 | *ap-proxi-mate |
| −6 | 0 | ×10 | 133.956 | 1.1058 | 19.20 | 15.77 | 50 | |
| +2 | 0 | ×10 | 132.856 | 2.31 | 56.79 | 33.98 | 50 | |
| +10 | 0 | ×10 | 130.758 | 5.152 | 207.9 | 74.61 | 50* | *is - getting hot |
| +6 | 0 | ×10 | 131.731 | 3.000 | 101.0 | 43.16 | 50* | " |

TABLE 3-continued

| PSMG dBm | AH dB | Gain | Fo kHz | Vin Vrms | I in mA rms | Uc Vrms | R Ω | Note/ Remark |
|---|---|---|---|---|---|---|---|---|
| +7.5 | 0 | ×10 | 131.478 | 3.445 | 121.9 | 49.6 | 50* | " |
| +13 | 0 | ×10 | 130.032 | 6.27 | 298.0 | 87.1 | 50* | " |
| −30 | 0 | ×10 | *135.000 | 0.0614 | 0.44 | 0.66 | 50 | *ap-proxi-mate |
| −20 | 0 | ×10 | 134.860 | 0.188 | 1.42 | 2.04 | 50 | |
| −10 | 0 | ×10 | 134.498 | 0.546 | 5.13 | 5.864 | 50 | |
| 0 | 0 | ×10 | 133.337 | 2.10 | 32.5 | 22.7 | 50 | |
| +4 | 0 | ×10 | 132.700 | 3.43 | 61.7 | 37.0 | 50 | |
| +7 | 0 | ×10 | 132.200 | 4.59 | 92.64 | 49.4 | 50 | |
| +10 | 20 | ×100 | 131.657 | 6.37 | 141 | 67.57 | 50 | |
| +13 | 20 | ×100 | 131.037 | 8.227 | 208.3 | 87.58 | 50 | |

TABLE 4

| Input (measured) | | | | Calculation | | | | |
|---|---|---|---|---|---|---|---|---|
| f res kHz | U in V rms | I in mA rms | Uc V rms | P in mW | Z in Ohm | L μH | X Ohm | Q UL U |
| 134.809 | 0.032 | 0.33 | 0.362 | 0.0106 | 96.970 | 90.507 | 76.662 | 161.872 |
| 134.797 | 0.0949 | 1.125 | 1.163 | 0.1068 | 84.356 | 90.523 | 76.669 | 165.242 |
| 134.625 | 0.403 | 5.460 | 5.030 | 2.200 | 73.810 | 90.754 | 76.767 | 149.784 |
| 133.956 | 1.106 | 19.200 | 15.770 | 21.231 | 57.594 | 91.663 | 77.150 | 151.827 |
| 132.856 | 2.310 | 56.790 | 33.980 | 131.185 | 40.676 | 93.187 | 77.789 | 113.147 |
| 131.731 | 3.000 | 101.000 | 43.160 | 303.000 | 29.703 | 94.786 | 78.463 | 78.363 |
| 131.478 | 3.445 | 121.900 | 49.600 | 419.946 | 28.261 | 95.151 | 78.604 | 74.529 |
| 130.758 | 5.152 | 207.900 | 74.610 | 1071.101 | 24.781 | 96.202 | 79.037 | 65.756 |
| 130.032 | 6.270 | 298.000 | 87.100 | 1868.460 | 21.040 | 97.279 | 79.478 | 51.086 |

Note the Q varying from around 50-160, and depending on the frequency, with frequencies closer to 135 Khz (resonance) working more effectively.

Another prototype used a 4 turn coupling coil, and had slightly higher Q values, as shown in Table 5.

TABLE 5

| | Input (measured) | | | | Calculation | | | | |
|---|---|---|---|---|---|---|---|---|---|
| Rem. | f res kHz | U in V rms | I in mA rms | Uc V rms | P in mW | Z in Ohm | L μH | X Ohm | Q UL U |
| * | 135 | 0.0614 | 0.44 | 0.66 | 0.0270 | 139.545 | 90.251 | 76.554 | 210.621 |
| * | 134.86 | 0.188 | 1.42 | 2.040 | 0.2670 | 132.394 | 90.438 | 76.633 | 203.422 |
| | 134.498 | 0.546 | 5.130 | 5.864 | 2.801 | 106.433 | 90.926 | 76.839 | 159.770 |
| | 133.337 | 2.100 | 32.500 | 22.700 | 68.250 | 64.615 | 92.516 | 77.508 | 97.409 |
| | 132.700 | 3.430 | 61.700 | 37.000 | 211.631 | 55.592 | 93.407 | 77.880 | 83.061 |
| | 132.200 | 4.590 | 92.640 | 49.400 | 425.218 | 49.547 | 94.115 | 78.175 | 73.413 |
| | 131.657 | 6.370 | 141.000 | 67.570 | 898.170 | 45.177 | 94.892 | 78.497 | 64.758 |
| | 131.037 | 8.227 | 208.300 | 87.580 | 1713.684 | 39.496 | 95.793 | 78.869 | 56.751 |
| f max | 147.369 | 5.140 | 86.700 | 51.000 | 445.638 | 59.285 | 75.737 | 70.128 | 83.227 |
| f min | 119.115 | 4.240 | 104.000 | 50.800 | 440.960 | 40.769 | 115.928 | 86.763 | 67.452 |

This device had slightly higher Q, as shown by Table 5.

The effect of moving the coil on the rod for the 4-turn coupling loop was tested and the results are shown in Table 6.

TABLE 6

| | Input (measured) | | | | Calculation | | | | |
|---|---|---|---|---|---|---|---|---|---|
| d mm | f res kHz | U in V rms | I in mA rms | Uc V rms | P in mW | Z in Ohm | L µH | X Ohm | Q UL U |
| 14.5* | 135.000 | 0.0953 | 0.89 | 0.924 | 0.0848 | 107.079 | 96.184 | 81.587 | 123.379 |
| 14.3* | 135.000 | 0.287 | 2.88 | 2.830 | 0.8266 | 99.653 | 96.184 | 81.587 | 118.763 |
| 13.6 | 135.000 | 0.840 | 10.540 | 9.390 | 8.854 | 79.696 | 96.184 | 81.587 | 122.065 |
| 12.4 | 135.000 | 2.248 | 38.810 | 25.200 | 87.245 | 57.923 | 96.184 | 81.587 | 89.216 |
| 12 | 135.000 | 3.044 | 58.390 | 34.020 | 177.739 | 52.132 | 96.184 | 81.587 | 79.812 |
| 11.5 | 135.000 | 4.253 | 91.270 | 47.200 | 388.171 | 46.598 | 96.184 | 81.587 | 70.346 |
| 10.6 | 135.000 | 6.131 | 145.500 | 67.020 | 892.061 | 42.137 | 96.184 | 81.587 | 61.716 |
| 10.1 | 135.000 | 8.095 | 210.700 | 87.800 | 1705.617 | 38.420 | 96.184 | 81.587 | 55.397 |

This shows how q is increased for the higher voltages and larger values of d (representing the distance 650) shown in FIG. 7B.

In a similar way, tests were made on the M device.

The tested values for this device showed:

L=33.77 µH (d=4 mm)

Q=193 (135 kHz, 100 mV)

→C=41.16 uF for $f_0$=135 kHz $L_{min}$=31.3 µH (d=0) Q=179

$L_{max}$=34.5 µH (d=8 mm) Q=193

Where "d" is the distance from the left edge, shown in FIG. 7B, and using a resonant frequency of 135 Khz.

A median calculation showed:

$$L = 31{,}78\ \mu\text{H}(d = 4\ \text{mm})Q = 179$$

$$\left.\begin{aligned} L_{min} &= 27{,}94\ \mu\text{H}(d = 0)Q = 160 \\ L_{max} &= 34{,}1\ \mu\text{H}(d = 8{,}7\ \text{mm})Q = 190 \end{aligned}\right\} \Delta L = 22\%$$

$$L \approx 31\ \mu\text{H} \rightarrow \frac{C = 44{,}8\ uF}{(135\ \text{kHz})}$$

$$L_{Luft} = 3{,}89\ \mu\text{H\_and\_}Q = 23{,}4$$

Therefore, two, 22 uF capacitors were used to bring this system to resonance.

Table 8 shows measured and calculated values:

TABLE 8

| | Input (measured) | | | | Calculation | | | | |
|---|---|---|---|---|---|---|---|---|---|
| Meas # | f res kHz | U in V rms | I in mA rms | Uc V rms | P in mW | Z in Ohm | L µH | X Ohm | Q UL U |
| | 135 | 0.013 | 0.08 | 0.07 | 0.0010 | 162.500 | 31.024 | 26.316 | 179.042 |
| | 134.97 | 0.04 | 0.27 | 0.22 | 0.0108 | 148.148 | 31.038 | 26.321 | 170.262 |
| | 134.9 | 0.11 | 0.85 | 0.620 | 0.094 | 129.412 | 31.070 | 26.335 | 156.114 |
| | 134.920 | 0.330 | 3.000 | 1.900 | 0.990 | 110.000 | 31.061 | 26.331 | 138.486 |
| | 134.752 | 1.000 | 11.000 | 6.000 | 11.000 | 90.909 | 31.138 | 26.364 | 124.137 |
| | 134.294 | 1.700 | 25.000 | 11.000 | 42.500 | 68.000 | 31.351 | 26.454 | 107.624 |
| | 133.113 | 3.200 | 63.000 | 22.000 | 201.800 | 50.794 | 31.910 | 26.668 | 89.957 |
| | 131.011 | 5.000 | 160.000 | 35.000 | 800.000 | 31.250 | 32.942 | 21.117 | 55.469 |

Table 9 shows the effects of different power levels:

TABLE 9

| $P_{SMG}$ dBm | AH dB | Gain | $f_0$ kHz | d 2) mm | $V_{in}$ $V_{rms}$ | $I_{in}$ $_{m}A_{rms}$ | $U_c$ $V_{rms}$ | R Ω |
|---|---|---|---|---|---|---|---|---|
| 1) −30 | 20 | ×100 | 135 | 2.7 | 0.072 | 1.43 | 0.604 | 50 |
| 1) −20 | 20 | ×100 | 135 | 2.7 | 0.223 | 3.90 | 1.876 | 50 |
| −10 | 20 | ×100 | 135 | 2.8 | 0.697 | 13.03 | 5.84 | 50 |
| 0 | 20 | ×100 | 135 | 2.7 | 2.063 | 43.02 | 17.26 | 50 |
| +3.5 | 20 | ×100 | 135 | 2.4 | 2.966 | 65.96 | 24.78 | 50 |
| +7 | 20 | ×100 | 135 | 2.1 | 4.130 | 102.373 | 4.54 | 50 |
| +10 | 20 | ×100 | 135 | 2.1 | 5.64 | 154.7 | 46.5 | 50 |

Tables 10-12 show the effect of changing d in the test prototype, 40 mm long, 10 mm diameter, 25 turns on the main coil over 17 mm, and 4 turns on the coupling coil.

TABLE 10

| d mm | f res kHz | U in V rms | I in mA rms | Uc V rms | P in mW | Z in Ohm | L μH | X Ohm | Q UL U |
|---|---|---|---|---|---|---|---|---|---|
| | Input (measured) | | | | Calculation | | | | |
| 2.7* | 135.000 | 0.072 | 1.43 | 0.604 | 0.1030 | 50.350 | 31.445 | 26.673 | 132.844 |
| 2.7* | 135.000 | 0.223 | 3.9 | 1.876 | 0.8697 | 57.179 | 31.445 | 26.673 | 151.716 |
| 2.8 | 135.000 | 0.697 | 13.030 | 5.840 | 9.082 | 53.492 | 31.445 | 26.673 | 140.794 |
| 2.7 | 135.000 | 2.063 | 43.020 | 17.260 | 88.750 | 47.954 | 31.445 | 26.673 | 125.848 |
| 2.4 | 135.000 | 2.966 | 65.960 | 24.780 | 195.637 | 44.967 | 31.445 | 26.673 | 117.676 |
| 2.1 | 135.000 | 4.130 | 102.370 | 34.540 | 422.788 | 40.344 | 31.445 | 26.673 | 105.793 |
| 2.1 | 135.000 | 5.640 | 154.700 | 46.500 | 872.508 | 36.458 | 31.445 | 26.673 | 92.912 |

TABLE 11

| d mm | f res kHz | U in V rms | I in mA rms | Uc V rms | P in mW | Z in Ohm | L μH | X Ohm | Q UL U |
|---|---|---|---|---|---|---|---|---|---|
| | Input (measured) | | | | Calculation | | | | |
| 4.5* | 135.000 | 0.0622 | 1.365 | 0.516 | 0.0849 | 45.568 | 31.445 | 26.673 | 117.574 |
| 4.5 | 135.000 | 0.1935 | 4.29 | 1.610 | 0.8301 | 45.105 | 31.445 | 26.673 | 117.071 |
| 4.4 | 135.000 | 0.601 | 14.200 | 4.895 | 8.534 | 42.324 | 31.445 | 26.673 | 105.264 |
| 4 | 135.000 | 1.690 | 44.850 | 14.030 | 76.797 | 37.681 | 31.445 | 26.673 | 97.366 |
| 3.9 | 135.000 | 2.685 | 76.200 | 22.260 | 204.597 | 35.236 | 31.445 | 26.673 | 90.800 |
| 3.8 | 135.000 | 3.720 | 108.500 | 30.580 | 403.620 | 34.286 | 31.445 | 26.673 | 86.864 |
| 3.7 | 135.000 | 5.270 | 158.400 | 41.920 | 834.768 | 33.270 | 31.445 | 26.673 | 78.925 |

TABLE 12

| d mm | f res kHz | U in V rms | I in mA rms | Uc V rms | P in mW | Z in Ohm | L μH | X Ohm | Q UL U |
|---|---|---|---|---|---|---|---|---|---|
| | Input (measured) | | | | Calculation | | | | |
| 4.3* | 135.000 | 0.0761 | 1.16 | 0.521 | 0.0883 | 65.603 | 31.445 | 26.673 | 115.284 |
| 4.3 | 135.000 | 0.2362 | 3.63 | 1.621 | 0.8574 | 65.069 | 31.445 | 26.673 | 114.899 |
| 4.1 | 135.000 | 0.732 | 11.880 | 4.895 | 8.696 | 61.616 | 31.445 | 26.673 | 103.303 |
| 3.8 | 135.000 | 2.154 | 40.660 | 14.760 | 87.582 | 52.976 | 31.445 | 26.673 | 93.260 |
| 3.7 | 135.000 | 3.350 | 66.960 | 22.780 | 224.316 | 50.030 | 31.445 | 26.673 | 86.733 |
| 3.7 | 135.000 | 4.590 | 94.740 | 31.270 | 434.857 | 48.448 | 31.445 | 26.673 | 84.303 |
| 3.6 | 135.000 | 6.530 | 135.500 | 42.690 | 884.815 | 48.192 | 31.445 | 26.673 | 77.221 |
| 3.4 | 135.000 | 8.790 | 199.900 | 59.100 | 1757.121 | 43.972 | 31.445 | 26.673 | 74.526 |

In a similar way, tests were made on the S device. 3 different flavors of the tested rod are used:

a) Original Z-Antenna new Barryvox $$\underline{19\,Windings\ 60x0{,}05,l} = 11\ \mathrm{mm}(\varnothing ca.0{,}5)$$

$$\left.\begin{array}{l} L_{min} = 12{,}24\ \mu\mathrm{H}\ \ Q = 122[105](d = 0) \\ L_{max} = 12{,}94\ \mu\mathrm{H}\ Q = 132[108](d = 3{,}3) \end{array}\right\} 5{,}4\% \quad \begin{array}{c} A1 \\ A2 \\ A3 \leftarrow Nr.101 \end{array}$$

$$19.3.08: R_{DC} = 94{,}1\ m\ell(1A)\,|\,L: 2{,}08\ \mu\mathrm{H}/Q = 19{,}3$$

This has an inductance of 2.08 uH.

b) 12 winding antenna $$\underline{12\ Wind.72x0{,}05},\ \ell = 8\ \mathrm{mm}$$

$$2 \times 7\ \mathrm{cm}\quad (\varnothing ca.0{,}6)$$

-continued $$\left.\begin{array}{l} L_{min} = 5{,}09\ \mu\mathrm{H}\ (d = 0)\ Q = 93[62] \\ L_{max} = 5{,}94\ \mu\mathrm{H}\ (d = 5\ \mathrm{mm})\ Q = 105[73] \end{array}\right\} 16{,}7\% \quad \begin{array}{c} B1 \\ B2 \end{array}$$

$$Measuredvalue: 5,\ 515\ \mu\mathrm{H} \rightarrow C = 252\ uF$$

$$L_{Luft} = 1{,}09\ \mu\mathrm{H}\ Q\ = 19{,}9\ (135\ \mathrm{kHz})\ B3$$

$$[13{,}7]$$

$$19.3.08: RDC = 67\ \mathrm{m}\Omega\ (1A)$$

c) Z-Antenna $$-Cu/135\ \mathrm{kHz}: 0{,}18\ \mathrm{mm}\left(\sim 1/\sqrt{f}\right)$$

$$\rightarrow \varnothing 0{,}2\ \mathrm{mm}\ r = 0{,}1\ \mathrm{mm}\ ist\ brandiben$$

$$\underline{29\,Wind.\varnothing 0,\ 20,}\ell = 7\ \mathrm{mm}$$

$$: 2 \times 7\ \mathrm{cm}$$

-continued $$\left.\begin{array}{l}L_{min} = 29{,}19\ \mu H\ Q = 41{,}7\ d = 0\\ L_{max} = 35{,}32\ \mu H\ Q = 51{,}9\ d = 5{,}2\end{array}\right\}21\%\ \begin{array}{l}C1\\ C2\end{array}$$

$$R_{DC} = 0{,}53\ \Omega\ (Huke\ 8060\ A)$$

$$L_{Luft} = 6{,}21\ \mu H\ Q = 94\ (135\ kHz)\quad C3$$

d) Z-Antenna Number 94

$$\underline{60\ Windings \varnothing 0{,}10\ mm}\ Cu\ell = 7\ mm$$

$$2 \times 7\ cm$$

$$\left.\begin{array}{l}L_{min} = 127{,}9\ \mu H\ Q = 25{,}3\ (d = 0)\\ L_{max} = 154{,}2\ \mu H\ Q = 30{,}8\ (d = 5{,}2)\end{array}\right\}20{,}5\%\ \begin{array}{l}D1\\ D2\end{array}$$

$$R_{DC} = 4{,}17\ \Omega\ (\text{Fluke } 8060\ A)$$

$$L_{Luft} = 25{,}76\ \mu H\ Q = 4{,}69\ (135\ kHz)\quad D3$$

e) Z-Antenna No. 93

$$\underline{19{,}5\ Windings HF-Litze\ 20 \times 0{,}5\ mm}\ \ell = 7\ mm$$

$$2 \times 7\ cm$$

$$\left.\begin{array}{l}L_{min} = 13{,}5\ \mu H\ Q = 34{,}8\ (d = 0)\\ L_{max} = 16{,}4\ \mu H\ Q = 42{,}1\ (d = 5{,}2)\end{array}\right\}21{,}5\%\ \begin{array}{l}E1\\ E2\end{array}$$

$$R_{DC} = 0{,}32\ \Omega\ (\text{Fluke } 8060\ A)$$

$$L_{Luft} = 2{,}93\ \mu H\ Q = 7{,}64\ (135\ kHz)\quad E3$$

f) Z-Antenna (No. 97)

$$\underline{20\ Windings \varnothing 0{,}3}\ Cu\ell = 7\ mm$$

$$Auschlusslange = 2 \times 7\ cm$$

$$\left.\begin{array}{l}L_{min} = 15{,}08\ \mu H\ Q = 47{,}4\ (d = 0)\\ L_{max} = 18{,}49\ \mu H\ Q = 61{,}6\ (d = 5\ mm)\end{array}\right\}22{,}6\%\ \begin{array}{l}N\\ O\end{array}$$

$$R_{DC} = 195{,}5\ m\Omega\ (bei 1A)$$

$$L_{Luft} = 3{,}31\ \mu H\ Q = 13{,}2\quad P$$

g) Antenna number 97a $$\underline{16\ Windings \varnothing 0{,}4\ mm}\ Cu\ell = 7\ mm$$

$$A 2 \times 7\ cm (Z - Ant.Nr.97)$$

-continued $$\left.\begin{array}{l}L_{min} = 8{,}73\ \mu H\ Q = 41{,}8\ (d = 0)\\ L_{max} = 10{,}7\ \mu H\ Q = 59{,}2\ (d = 5{,}2\ mm)\end{array}\right\}\begin{array}{l}G1\\ G2\end{array}$$

$$R_{DC} = 89{,}5\ m\Omega\ (1\ A)$$

$$L_{Luft} = 1{,}95\ \mu H\ Q = 15{,}4\quad G3$$

h) Antenna z1

$$\underline{38\ Windings \varnothing 0{,}3\ mm\ Cu}\ell = 7\ mm/6{,}5\ mm$$

$$2\ \text{versions}: where Lage 20 Wind,\ \ell = 7$$

$$obere Lage 18 Wind,\ \ell = 6{,}5$$

$$Polyesterca. 0{,}05\ mm\ dich$$

$$Auschlusslange\ 2 \times 7\ cm (Z - Ant.Nr.97)$$

$$\left.\begin{array}{l}L_{min} = 51{,}83\ \mu H\ Q = 57{,}3\ (d = 0)\\ L_{max} = 63{,}38\ \mu H\ Q = 79{,}0\ (d = 5{,}2\ mm)\end{array}\right\}22{,}2\%\ \begin{array}{l}H1\\ H2\end{array}$$

$$R_{DC} = 0{,}34\ \Omega\ (\text{Fluke } 8060\ A)$$

$$L_{Luft} = 11{,}59\ \mu H\ Q = 20{,}8\quad H3$$

$$L_{Mitke} = 57{,}6\ \mu H \rightarrow C = 24{,}13\ uF$$

i) Antenna x $$\underline{45\ windings \varnothing 0{,}26\ mm\ Cu}\ell = 7/6{,}5$$

$$2\text{versions}: where 23 Wind,\ \ell = 7$$

$$22 Wind,\ \ell = 6{,}5$$

$$Polyesterca. 0{,}05\ mm$$

$$2 \times 7\ cm (Z - Ant.Kern Nr.97)$$

$$\left.\begin{array}{l}L_{min} = 70{,}58\ \mu H\ Q = 63{,}8\ (d = 0)\\ L_{max} = 87{,}06\ \mu H\ Q = 86{,}7\ (d = 5{,}2)\end{array}\right\}$$

$$23{,}3\%\ \begin{array}{l}I1\\ I2\end{array}$$

$$R_{DC} 0{,}53\ \Omega\ (\text{Fluke } 8060\ A)$$

$$L_{Luft} = 15{,}8\ \mu H\ Q = 20{,}52\quad I3$$

$$\Rightarrow \text{This version maximizes } Q \text{ for } L.$$

$$\text{Versions } c) \ldots i): \ell = 7\ mm$$

$$\text{for } L: 78{,}82\ \mu H \rightarrow C = 17{,}63\ uF$$

For the tested device with length 21.5 mm, 8 mm in diameter, 12 turn main coil, and d of 1 mm from the end of the rod; wire type 72, and a 252 nF capacitor, the following values were obtained via testing:

TABLE 13

| Input (measured) | | | | | Calculation | | | | |
|---|---|---|---|---|---|---|---|---|---|
| Meas # | f res kHz | U in V rms | I in mA rms | Uc V rms | P in mW | Z in Ohm | L µH | X Ohm | Q UL U |
| | 135 | 0.013 | 0.08 | 0.022 | 0.0010 | 162.500 | 5.515 | 4.678 | 99.478 |
| | 134.97 | 0.04 | 0.27 | 0.07 | 0.0108 | 148.148 | 5.518 | 4.679 | 96.959 |
| | 134.9 | 0.11 | 0.85 | 0.200 | 0.094 | 129.412 | 5.524 | 4.682 | 91.378 |
| | 134.920 | 0.330 | 3.000 | 0.630 | 0.990 | 110.000 | 5.522 | 4.681 | 85.645 |
| | 134.752 | 1.000 | 11.000 | 1.900 | 11.000 | 90.909 | 5.536 | 4.687 | 70.021 |

TABLE 13-continued

| Input (measured) | | | | | Calculation | | | | |
|---|---|---|---|---|---|---|---|---|---|
| Meas # | f res kHz | U in V rms | I in mA rms | Uc V rms | P in mW | Z in Ohm | L µH | X Ohm | Q UL U |
| | 134.294 | 1.600 | 32.000 | 3.500 | 51.200 | 50.000 | 5.573 | 4.703 | 50.875 |
| | 133.113 | 2.500 | 80.000 | 5.500 | 200.000 | 31.250 | 5.673 | 4.745 | 31.878 |

Another prototype of the 45 winding, 0.26 mm diameter antenna was tested with a 19.22 uF capacitor, which were tested to have the following values:

TABLE 14

| $P_{SMG}$ dBm | Att dB | Gain | fo kHz | D mm | $U_{in}$ $V_{rms}$ | $I_{in}$ $_mA_{rms}$ | $U_c$ $V_{rms}$ | R Ω | |
|---|---|---|---|---|---|---|---|---|---|
| −30 | 20 | ×100 | 135 | 0.4 | 0.0606 | 1.390 | 0.571 | 50 | |
| −20 | 20 | ×100 | 135 | 0.4 | 0.1902 | 4.326 | 1.803 | 50 | |
| −10 | 20 | ×100 | 135 | 0.4 | 0.608 | 14.04 | 5.695 | 50 | |
| 0 | 20 | ×100 | 135 | 0.4 | 2.748 | 68.06 | 25.92 | 50 | → 84 mm |
| +3.5 | 20 | ×100 | 135 | 0.4 | 2.748 | 68.06 | 25.92 | 50 | → 187 mm |
| +7 | 20 | ×100 | 135 | 0.3 | 4.121 | 102.75 | 38.93 | 50 | |
| +10 | 20 | ×100 | 135 | 0.2 | 5.93 | 147.7 | 55.28 | 50 | only 10 seconds tested |
| | | | | ↑ dmax | | | | | |

Yet another prototype has a 21.5 mm rod of 8 mm diameter. The main coil used 45 turns at 7 mm. The coupling coil used 2 turns, started 0.2 mm from the end of the coil. The results as a function of "d", the number of mm from the end of the coil, were

TABLE 15

| | Input (measured) | | | | Calculation | | | | |
|---|---|---|---|---|---|---|---|---|---|
| d mm | f res kHz | U in V rms | I in mA rms | Uc V rms | P in mW | Z in Ohm | L µH | X Ohm | Q UL U |
| 0.4* | 135.000 | 0.0606 | 1.39 | 0.571 | 0.0842 | 43.597 | 72.313 | 61.338 | 63.103 |
| 0.4 | 135.000 | 0.1902 | 4.326 | 1.803 | 0.8228 | 43.967 | 72.313 | 61.338 | 64.411 |
| 0.4 | 135.000 | 0.608 | 14.040 | 5.695 | 8.536 | 43.305 | 72.313 | 61.338 | 61.942 |
| 0.4 | 135.000 | 1.871 | 44.830 | 17.650 | 83.877 | 41.735 | 72.313 | 61.338 | 60.550 |
| 0.4 | 135.000 | 2.748 | 68.060 | 25.920 | 187.029 | 40.376 | 72.313 | 61.338 | 58.564 |
| 0.3 | 135.000 | 4.121 | 102.750 | 38.930 | 423.433 | 40.107 | 72.313 | 61.338 | 58.351 |
| 0.2 | 135.000 | 5.930 | 147.700 | 55.280 | 875.861 | 40.149 | 72.313 | 61.338 | 56.881 |

Yet another prototype relates the number of windings to the precise tuning of the inductor. This exemplary embodiment uses a 30×31 mm antenna.

The number of windings, N, can be related to the distance d in mm:

TABLE 16

| | N | | | |
|---|---|---|---|---|
| | 45 | 44 | 43 | 42 |
| d (mm) | 0.4 | 0.8 | 1.5 | 2.1 |

inductance and resonance values were found as:

42 Wind: 303 kHz→

43 Wind: 296 kHz→15.042 µH

45 Wind: 287 kHz→16.00 µH

In one exemplary embodiment, the number of windings of the coupling loop was related to the impedance. Many times, a 50 ohm impedance is desirable. For a 43 winding secondary, a 7 winding coupling loop may be optimal. For this exemplary embodiment,

| 43 Wind/7Wind | | | |
|---|---|---|---|
| $P_{Gen}$ | $V_{in}$ | $I_{in}$ | $U_c$ |
| −2 dBm | 1.552 V | 34.55 mA | 14.55 V |
| → $P_{IN}$ = 53.6 mW | | | $Z_{in}$ = 44.9 Ohm |

→ 7 Windings is the optimal value for the coupling loop characteristics: 43/7 Windings (43 windings main loop, 7 windings coupling loop), resonant frequency: 129-139 kHz

TABLE 17

| $P_{SMG}$ dBm | Att dB | Gain | fo kHz | d mm | $U_{in}$ $V_{rms}$ | $I_{in}$ $_mA_{rms}$ | $U_c$ $V_{rms}$ | R Ω |
|---|---|---|---|---|---|---|---|---|
| −30 | 20 | ×100 | 135 | 1.7 | 0.0684 | 1.265 | 0.612 | 50 |
| −20 | 20 | ×100 | 135 | 1.7 | 0.215 | 3.940 | 1.930 | 50 |
| −10 | 20 | ×100 | 135 | 1.7 | 0.686 | 12.89 | 6.10 | 50 |
| −3 | 20 | ×100 | 135 | 1.6 | 1.495 | 28.95 | 13.48 | 50 |
| 0 | 20 | ×100 | 135 | 1.6 | 2.092 | 41.26 | 18.81 | 50 |

TABLE 17-continued

| $P_{SMG}$ dBm | Att dB | Gain | fo kHz | d mm | $U_{in}$ $V_{rms}$ | $I_{in}$ $_mA_{rms}$ | $U_c$ $V_{rms}$ | R Ω |
|---|---|---|---|---|---|---|---|---|
| +3 | 20 | ×100 | 135 | 1.6 | 2.953 | 59.26 | 26.59 | 50 |
| +6 | 20 | ×100 | 135 | 1.5 | 4.114 | 84.02 | 37.02 | 50 |

The inductance creates a 15 uH inductance (in air, without the ferrite). Values of this exemplary embodiment, using a 20 nF capacitor (2*10 nF) were found as:

TABLE 18

| d | Input (measured) | | | | Calculation | | | | |
|---|---|---|---|---|---|---|---|---|---|
| d mm | f res kHz | U in V rms | I in mA rms | Uc V rms | P in mW | Z in Ohm | L μH | X Ohm | Q UL U |
| 1.7* | 135.000 | 0.0684 | 1.265 | 0.612 | 0.0865 | 54.071 | 72.313 | 61.338 | 70.571 |
| 1.7 | 135.000 | 0.215 | 3.94 | 1.930 | 0.8471 | 54.569 | 72.313 | 61.338 | 71.688 |
| 1.7 | 135.000 | 0.686 | 12.890 | 6.100 | 8.843 | 53.220 | 72.313 | 61.338 | 68.604 |
| 1.6 | 135.000 | 1.495 | 28.950 | 13.480 | 43.280 | 51.641 | 72.313 | 61.338 | 68.447 |
| 1.6 | 135.000 | 2.092 | 41.260 | 18.810 | 86.316 | 50.703 | 72.313 | 61.338 | 66.827 |
| 1.6 | 135.000 | 2.953 | 59.260 | 26.590 | 174.995 | 49.831 | 72.313 | 61.338 | 65.869 |
| 1.5 | 135.000 | 4.114 | 84.020 | 37.020 | 345.658 | 48.965 | 72.313 | 61.338 | 64.639 |

As can be seen from the above, this system may optimize the coupling inductive loop separately from the main inductive loop (that is in parallel with the capacitor).

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power system, comprising:

a circuit configured to transmit a modulated power signal having a first frequency or to receive power via a wireless field and rectify the received power;

a ferrite core positioned stationarily in a device;

a loop base;

a main inductive loop that has a first number of loop turns on the loop base, the main inductive loop being electrically coupled to the circuit; and a coupling loop having a second number of loop turns on the loop base, the coupling loop having fewer loop turns than the main loop, the coupling loop and the main loop being physically coupled to one another, being positioned adjoining to each other, and being movable relative to the stationarily positioned ferrite core, such that both the main loop and the coupling loop move together on the loop base, the device comprising a housing surrounding the main loop, and the coupling loop and the circuit.

2. A system as in claim 1, wherein the circuit receives power via a wireless field at a frequency that is resonant with said main inductive loop, and creates a power output, the circuit coupled to provide an output to the main inductive loop.

3. A system as in claim 1, wherein the circuit creates a power output, at a frequency that is resonant with said main inductive loop, the circuit receiving power from the main inductive loop and transmitting power via a wireless field.

4. A system as in claim 1, additionally comprising a connection that includes a plurality of flexible wires, that connect to the coupling loop, wherever it is moved on said loop base.

5. A system as in claim 1, wherein the stationary ferrite core is located within the diameter of the loop base having the main inductive loop and the coupling loop, and wherein the main inductive loop and the coupling loop are wound on the exterior surface of the loop base.

6. A system as in claim 1, wherein a number of windings on the coupling loop is used to set an input impedance of the system.

7. A system as in claim 1, further comprising a capacitance, coupled across said main inductive loop.

8. A system as in claim 7, wherein said capacitance has a value such that an LC value of said inductance and capacitance together is resonant with the first frequency.

9. A system as in claim eight, wherein said first frequency is 135 kHz.

10. A system as in claim 1, wherein the main inductive loop is not concentric with the coupling loop on the loop base.

11. A method of transmitting power via a wireless field, comprising:

receiving power from a power source via a coupling loop of a coil, the coil having a ferrite core positioned stationarily in a device;

transferring power to a main inductive loop of the coil mechanically adjoined to the coupling loop on a movable loop base, the main inductive loop being electrically isolated from the coupling loop, the main inductive loop and the coupling loop being movable on the loop base relative to the stationarily positioned ferrite core so as to position the main inductive loop and the coupling loop; and transmitting power, via the wireless field, based on the configured position of the coupling loop and the main inductive loop against the stationarily positioned ferrite core, the device comprising a housing surrounding the main inductive loop, the coupling loop and the ferrite core.

12. A method as in claim 11, wherein the coupling loop is configured according to a desired input impedance of the coil.

13. A method as in claim 11, further comprising coupling a capacitor across the main loop, wherein said main loop and said capacitor collectively create an LC constant which is resonant with a first frequency of the wireless transmission of power.

14. A method as in claim 13, wherein said first frequency is 135 kHz.

15. A method as in claim 13, wherein the coupling loop and the main inductive loop are physically connected on the loop base, the method further comprising moving the connected coupling loop and main inductive loop to new locations to configure a characteristic of the coupling loop and main inductive loop.

16. A method as in claim 15, further comprising winding the coupling loop and the main inductive loop on a core, and wherein said moving is relative to said stationarily positioned core.

17. A method as in claim 11, wherein transmitting power comprises transmitting the power from a wireless power transmitter that produces a modulated power signal at a selected frequency.

18. A method of receiving power via a wireless field associated with a receiver, comprising:

receiving power via the wireless field with a main inductive loop of the coil connected to the receiver, the coil having a ferrite core positioned stationarily in a device;

transferring power to a coupling loop of the coil, the main inductive loop being mechanically adjoined to the coupling loop on a movable loop base, the main inductive loop and the coupling loop being electrically isolated from each other, the main inductive loop and the coupling loop being movable on the loop base relative to the stationarily positioned ferrite core so as to position the main inductive loop and the coupling loop; and transferring power to a load based on the configured position of the coupling loop and the main inductive loop against the stationarily positioned ferrite core, the device comprising a housing surrounding the main loop, and the coupling loop.

19. A method as in claim 18, wherein the coupling loop is configured according to a desired input impedance of the coil.

20. A method of as in claim 18, further comprising coupling a capacitor across the main inductive loop, wherein said main inductive loop and said capacitor collectively create an LC constant which is resonant with a first frequency of said transmission of wireless power.

21. A method as in claim 20, wherein said first frequency is 135 kHz.

22. A method as in claim 20, wherein the coupling loop is connected to the main inductive loop, the method further comprising moving the connected coupling loop and main inductive loop to new locations to configure a characteristic of the coupling loop and main inductive loop.

23. A method as in claim 18, wherein receiving power comprises receiving the power at the receiver that rectifies the received power.

24. A system for transmitting power via a wireless field, comprising:

means for receiving power from a power source;

means for transferring power to a main inductive loop, the main inductive loop being mechanically adjoined to the means for receiving power on a movable loop base, the main inductive loop being electrically isolated from the means for receiving power, the main inductive loop and the means for receiving power being movable on the loop base relative to a ferrite core positioned stationarily in a device, the device comprising a housing surrounding the main inductive loop, the means for receiving power and the ferrite core; and means for transmitting power, via the wireless field, based on a configured position of the means for receiving power and the main inductive loop against the stationarily positioned ferrite core.

25. A system as in claim 24, wherein the means for receiving power comprises a coupling loop, and wherein at least a selected coil parameter is configured separately in each of the coupling loop and main loop.

26. A system as in claim 24, wherein the means for transmitting power comprises a power transmitter that produces a modulated power signal at a selected frequency.

27. A system for receiving power via a wireless field associated with a receiver, comprising:

means for receiving power via a wireless field associated with the receiver, the means for receiving power being connected to the receiver;

first means for transferring power from the means for receiving power to a coupling loop, the coupling loop being mechanically adjoined to the first means for transferring power on a movable loop base, the coupling loop and the first means for transferring power being electrically isolated from each other and movable relative to a ferrite core positioned stationarily in a device, the device comprising a housing surrounding the coupling loop, the first means for transferring power and the ferrite core; and second means for transferring power to a load based on the configured position of the coupling loop and the means for receiving power against the stationarily positioned ferrite core.

28. A system as in claim 27, wherein the first means for transferring power comprises a main inductive loop, and wherein at least a selected coil parameter is configured separately in each of the coupling loop and main inductive loop.

* * * * *